Jan. 6, 1959     E. J. ROBERTS     2,867,506
PRODUCING SULPHUR DIOXIDE GAS
Filed July 18, 1956     2 Sheets-Sheet 1

Fig. I.

INVENTOR
Elliott J. Roberts
BY Robert A. Finch
ATTORNEY

Jan. 6, 1959  E. J. ROBERTS  2,867,506
PRODUCING SULPHUR DIOXIDE GAS
Filed July 18, 1956  2 Sheets-Sheet 2

INVENTOR
Elliott J. Roberts
BY
Robert R. Finch
ATTORNEY

United States Patent Office 2,867,506
Patented Jan. 6, 1959

2,867,506

PRODUCING SULPHUR DIOXIDE GAS

Elliott J. Roberts, Westport, Conn., assignor to Dorr-Oliver Incorporated, Stamford, Conn., a corporation of Delaware Application July 18, 1956, Serial No. 598,598

1 Claim. (Cl. 23—177)

This invention relates generally to the production of sulfur-dioxide gas from sulfur bearing ores. More particularly, the invention provides ways and means for producing relatively strong sulfur-dioxide gas from such ores while utilizing the entire sulfur content thereof.

The present application is a continuation-in-part of my co-pending application Serial No. 238,468, filed July 25, 1951, for "Producing Sulfur Dioxide Gas," now abandoned, which disclosed a process for treating sulfur bearing solids to produce relatively strong sulfur dioxide gas of a sulfur dioxide content greater than that attainable by air roasting alone.

Heretofore, it has been accepted practice to produce sulfur-dioxide gas by air roasting of sulfur-bearing ores such as iron-sulfides. Although such prior methods are highly successful for producing sulfur-dioxide gas for a variety of uses and are economically attractive in that substantially all of the sulfur content of the ore is recovered, they are still not all that is to be desired. This is so because the strongest gas attainable by such methods is relatively dilute, being of the order of 12–16% sulfur-dioxide and cannot be directly utilized in processes wherein a gas having a sulfur-dioxide content greater than 16% is required.

It is a principal object of the invention to provide ways and means for treating sulfur-bearing ores, such as iron sulfides, to produce therefrom a gas having a higher sulfur-dioxide content than attainable by air roasting, and at the same time to obtain substantially complete recovery of the sulfur content of the ore.

It is another object to provide ways nad means whereby the sulfur-dioxide content of the gas produced may be controllably varied over a wide range from a relatively dilute gas to a gas having a relatively high sulfur-dioxide content of, said, 30–40%.

Briefly, this invention revolves about the concept of sequentially treating sulfidic-sulfur bearing ore solids in a series of fluidizing beds through which such solids pass in counter-current motion relative to the treatment gases. In an initial reaction bed part of the sulfur reacts with a deliberately added solid oxygen carrier to yield sulfur-dioxide as well as partially desulfurized solids. Such partially treated solids are then transferred to a secondary reaction bed where their residual sulfur is reacted with a free oxygen-bearing gas, such as air, to produce dilute sulfur-dioxide. The resulting dilute sulfur-dioxide gas is utilized to fluidize the initial reaction bed while at the same time diluting the sulfur-dioxide gas produced in such bed to yield a gas of desired sulfur dioxide content.

By solid oxygen carrier is meant a metal-oxide that will react, in a higher valence state with a sulfide of the same metal to produce sulfur dioxide gas. More particularly, for the purpose of this invention, the oxygen carrier is further defined as a multi-valent metal-oxide, which in a form exhibiting a lower valence can exist in equilibrium with the sulfide of the same metal at a sulfur oxidation temperature while a form exhibiting a higher valence cannot exist in equilibrium with the sulfide of the same metal at such temperature. An example of such a metal is iron. Ferric-oxide ($Fe_2O_3$) is the highest oxidation state while a lower oxidation state is magnetite ($Fe_3O_4$) and a sulfide form is FeS. The higher oxidation state, $Fe_2O_3$ cannot exist in equilibrium with the sulfide (FeS) at reaction temperature, but will react to form sulfur-dioxide; and a lower oxidation state, $Fe_3O_4$ will exist in equilibrium with unreacted sulfur. The importance of this requirement will become apparent as this specification proceeds. Another important requirement of the solid oxygen carrier is that it be of a nature that will not sinter or soften at the reaction temperatures employed and that it be capable of reoxidation without sintering or softening. Of course, the oxygen carrier should have an oxidizing potential sufficient to oxidize sulfur to $SO_2$ but not beyond that state. As noted above, oxides of iron, particularly $Fe_2O_3$ meet the requirements as to the oxygen carrier, while iron sulfides such as FeS and $FeS_2$, or low grade sulfur ores may be employed as the solid sulfur bearing material. The present specification is generally confined to a description of an iron-oxide pyrites reaction since that is an important field.

Obviously, temperatures of operation in each of the reaction zones as well as in the regeneration zone will vary over a considerable range according to local conditions, the type of ore available, and so forth. Generally speaking, however, the reaction between pyrite and hematite should be carried out at temperatures in the range of 700–900° C. with the higher temperature favoring the reaction, while the secondary zone roasting of residual sulfur should be carried out in the range of 850–1100° C. The regeneration zone should be maintained in a range of 850–1100° C. with preference towards the higher temperature in order to transfer as much heat as possible to the first stage by recirculation of regenerated oxides. In all cases, the limitation must be observed that the temperatures employed do not cause sintering or softening of the solids in the bed as that would cause defluidization.

Variations in the sulfur-dioxide content of the product gas may be effected by regulating within limits the quantity of air supplied to the secondary reaction bed; that is to say, if a more dilute product gas is desired, an excess of air is supplied to the secondary reaction bed. If on the other hand a higher sulfur-dioxide content is desired, the air supplied to the secondary bed is maintained at or near the minimum amount required to oxidize substantially all of the residual sulfide-sulfur while minimizing the production of high valence metal-oxide therein. In the latter case, if additional gas is required for fluidization in the secondary bed, it can be furnished by recycling a portion of product gas. Such recycling of product gas is also desirable in that it promotes reaction between sulfur and metal-oxide in the latter stages of such reaction. Moreover, recycling sulfur-dioxide gas through the secondary bed furnishes a means for the increased utilization of the heat yielded in the bed by furnishing a non-diluting heat-transfer gas for transferring sensible heat from the secondary zone to the initial zone.

In summary, the objects of this invention are attained by partially reacting finely-divided sulfur-bearing as pyrite with a multi-valence solid oxygen carrier, such as $Fe_2O_3$, under solids-fluidizing conditions in an initial reaction zone whereby a substantial quantity of the sulfur of the ore is oxidized to substantially pure sulfur-dioxide. The partially reacted solids are transferred to a second fluidized-solids reaction zone where their residual sulfur is air roasted to produce a sulfur-dioxide gas which is used both to fluidize the initial reaction zone and to dilute the gas produced therein to a desired sulfur-dioxide content. The sulfur-dioxide content of the gas discharged from the initial reaction zone is controlled by regulating the quantity of air supplied to the secondary reaction zone.

In accordance with an important feature of the invention, partially treated solids and elemental sulfur vapor which may be entrained in the gases leaving the initial reaction zone are contacted with oxygen to recover such sulfur as sulfur-dioxide gas thereby effecting complete recovery of sulfur and avoiding undesirable condensation of sulfur upon subsequent cooling of the gas.

A further feature of flexibility according to this invention lies in the use of a moderate quantity of auxiliary air in the initial reaction zone to air-roast some of the sulfur therein for the generation of heat required for reactions in that zone while at the same time producing a dilute sulfur-dioxide gas therein. Thus by regulating the quantity of auxiliary air supplied to the initial zone, a measure of control over the sulfur-dioxide content of the product gas is attained, while at the same time a control over temperatures within the initial reaction zone is attained.

Thus according to this invention a product gas is attainable having a sulfur-dioxide content significantly higher than attainable by prior conventional air-roasting methods while substantially all of the sulfur content of the ore is recovered.

Solids discharged from the secondary reaction zone are substantially sulfur free and comprise mainly iron oxides in a lower oxidation state. These solids are transferred to a final fluidized-solids reaction or regeneration zone where they are exothermically oxidized in an uprising stream of air. In this latter zone the solids are regenerated to raise their oxidation state and a portion of such regenerated solids is sent to the initial reaction zone for reaction therein. Since the regeneration reaction is exothermic, metal oxides produced thereby have a high sensible heat content so recycling of regenerated solids provides heat for reaction in the initial reaction zone.

Assuming, for example, that the sulfur-bearing ore is pyrite ($FeS_2$), the metal-oxide is hematite ($Fe_2O_3$) and a product gas of approximately 24% sulfur-dioxide is desired: During the initial reaction hematite is reduced to magnetite while sulfide-sulfur is oxidized to sulfur-dioxide according to the equation (Ia) $Heat + FeS_2 + 6Fe_2O_3 \rightarrow FeS + 4Fe_3O_4 + SO_2$ gas The gas thus produced is substantially pure sulfur-dioxide, but may be contaminated with a minor amount of elemental sulfur vapor which is oxidized as hereinafter described for recovery as product gas. About 50% of the total sulfur remains as sulfide-sulfur in the form of FeS and is recovered by air roasting in the secondary reaction zone to produce a dilute slufur-dioxide gas. The reaction in the secondary zone proceeds according to the equation:

(II) $6FeS + 10O_2 \rightarrow 2Fe_3O_4 + 6SO_2$

This is an exothermic reaction and some of the yielded heat is transferred to the uprising gas stream to be carried to the initial reaction zone to furnish part of the heat for reactions therein.

In a final or regeneration zone air is used to re-oxidize the magnetite to hematite according to the equation:

(III) $\frac{1}{2}O_2 + 2Fe_3O_4 \rightarrow 3Fe_2O_3 + heat$

Heated $Fe_2O_3$ solids, as needed, are recirculated to the first reaction zone to furnish both oxygen and heat for the reaction between sulfide-sulfur and hematite therein.

The process of this invention is autogenous and comprises the steps of first establishing a fluidized bed of finely-divided sulfur-bearing solids in mixture with finely-divided metal-oxide solids under conditions whereby part of the sulfur reacts with oxides to form substantially pure sulfur-dioxide gas while leaving unreacted sulfide-sulfur residually in the solids. The partially reacted solids are transferred to a second reaction zone where the residual sulfur is roasted under solids-fluidizing conditions to recover such sulfur as a dilute slufur-dioxide gas while yielding substantially sulfur-free residual solids. Substantially sulfur-free solids are transferred from the secondary reaction zone to a regeneration zone where the metallic oxides are exothermically oxidized or regenerated for reuse as an oxygen carrier. Part of the regenerated oxides are recirculated to the initial reaction zone as needed and the remainder are discharged from the system. Dilute sulfur-dioxide gas from the second reaction zone is utilized as a fluidizing gas for the initial zone and serves a dual function in that it also acts to dilute the pure sulfur-dioxide to a gas of the desired strength.

A modification of the invention, useful under special conditions, is to carry out the reaction between sulfide-sulfur and oxide in a plurality of steps whereby the metal-oxygen carrier is added incrementally to the reaction mass thus promoting the speed and efficiency of the reaction. Such stepwise reaction may be carried out with or without the aid of auxiliary air, depending upon local conditions, the nature of the ore being treated and the dilution desired in the product gas. This modification is not the equivalent of the basic invention, but is useful under different conditions.

Before presenting a detailed description of the apparatus and process invention hereof, it will be advisable to discuss the general nature and operation of fluidized bed reactors as referred to herein.

In general, in the fluidized bed technique for treating solids a bed of subdivided solid particles is maintained as a dense non-stratifying homogenous suspension behaving like a turbulent liquid and exhibiting a fluid level. This is accomplished by passing through the bed an uprising stream of gas at a velocity sufficient to considerably expand the depth of the bed as well as to maintain its particles in turbulent suspension in the uprising gas stream. Under such conditions the bed is called a fluidized bed. The fluid level of such a bed may be maintained constant by the use of an overflow arrangement so that as more solid particles are introduced into the bed the resulting increased depth cause the particles to overflow just as a liquid does.

In a reactor having a plurality of zones, several beds may be simultaneously maintained in a fluidized state. Each fluidized bed is usually a separate distinct treatment stage and treated solid particles from a first bed are allowed to overflow or are otherwise transferred to a second bed for further treatment thence, if desired, to an even further bed for more treatment, etc. This process continues until the particles have passed through all of the fluidized beds after which they are discharged from the reactor.

Due to turbulence within fluidized beds, heat exchange by and among the particles thereof is very rapid and particles added to the bed are almost instantaneously heated to the temperature of the bed. Further, this rapid heat exchange maintains a substantially uniform temperature throughout the bed.

In the usual fluidized operation there is a certain quantity of solids entrained in the outgoing gas stream. It is usual practice to recover the bulk of such solids in a cyclone and then, particularly if the gas is to be further used, to pass the gas through a scrubber where extremely fine solids are separated. In the process of this invention, such solids contain a substantial amount of sulfide sulfur which would in accordance with prior practice be washed from the gases in the scrubber and lost from process. Moreover, since the primary reaction is actually carried out in an oxygen deficiency, there will be elemental sulfur vapor in the gas stream. This will be particularly troublesome in the case where pyrite (FeS$_2$) is the iron sulfide. As hereinafter discussed in more detail, the present invention avoids sulfur loss by the novel expedient of introducing air or other oxygen-bearing gas into the gas stream to effect oxidation of the sulfide sulfur and elemental sulfur vapor to sulfur-dioxide. This effects recovery of all the sulfur in the form of sulfur-dioxide gas and also prevents fouling of the scrubber by condensation of elemental sulfur.

Although this feature of the invention is herein described with particular reference to the case where the initial reaction is a solid state reaction, it is to be understood that it may be used to advantage in any fluidized process wherein desulfurization is carried out in a plurality of stages and the first stage is oxygen deficient so that unreacted sulfur is present in the product gas stream.

As this invention may be embodied in several forms without departing from the spirit or essential characteristics thereof, the present embodiment is therefore illustrative and not restrictive, since the scope of the invention is defined by the appended claims rather than by the description preceding them, all changes that fall within the metes and bounds of the claim, or equivalents of such metes and bounds, are therefore intended to be embraced by the claim.

Figure 1:
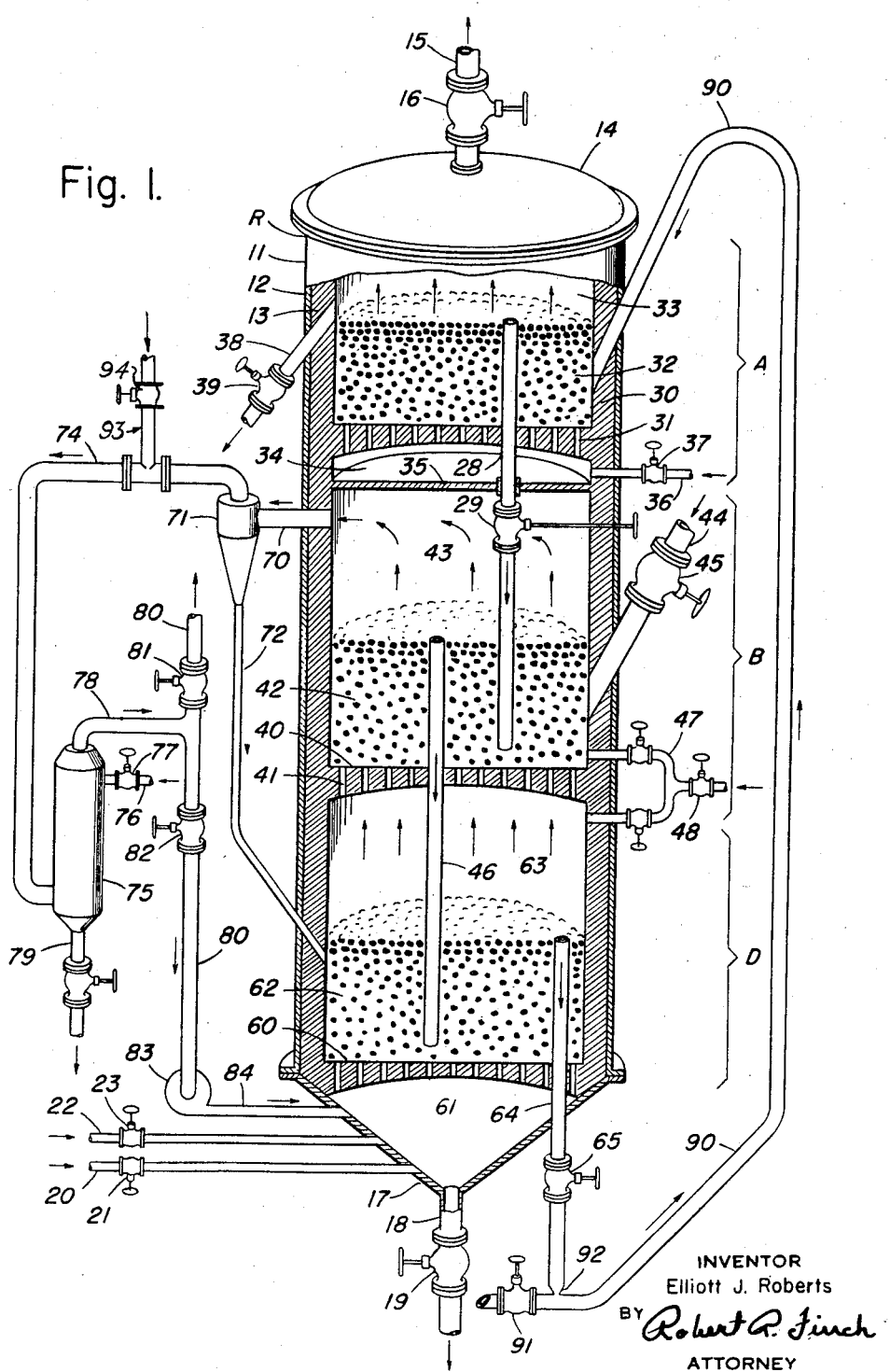
Figure 1 shows a fluidized solids reactor adapted to carry out the process of this invention.

In Figure 1 a reactor "R" is made up of a cylindrical shell 11 having a metal outer wall 12 and lined with refractory material 13. The reactor has a top 14 which is equipped with a gas discharge conduit 15 provided with a valve 16 and has a coned bottom 17 provided with a clean-out conduit 18 having a valve 19. Fluidizing gas is supplied to the coned bottom via a conduit 20 which is valved as at 21. Fuel for starting up can be furnished through a conduit 22 which is valved as at 23 and such fuel combusted in a burner not shown.

The reactor is divided functionally into zones such as A, B and D. Zone A is a regeneration zone for the production of regenerated metal-oxides and heat. Zone B is an initial reaction zone while zone D is a secondary reaction zone.

In zone A there is provided a gas permeable plate 30 extending throughout the cross-sectional area of the reactor and equipped with apertures such as 31. This plate, commonly called a constriction plate, is adapted to hold thereon a bed 32 of finely-divided solids undergoing treatment above which is a freeboard space 33. Spaced below the constriction plate is a solid partition 35 which extends throughout the cross-sectional area of the reactor so as to define a plenum space 34. Fluidizing and oxidizing gas is supplied to this plenum space via conduit 36 which is valved as at 37. Zone A is also equipped with two solids discharge conduits; one such conduit 38, which is valved as at 39, is used for discharging solids from the bed to a point outside the reactor; a second discharge conduit or overflow pipe 28 equipped with a solids-flow regulator 29 is provided for transferring solids from bed 32 of zone A into bed 42 of zone B.

Zone B is provided with a constriction plate 40 having apertures such as 41 and adapted to hold thereon a bed 42 of finely-divided solids above which is a free-board space 43. Raw untreated solids are introduced into bed 42 via conduit 44 and the quantity of solids so introduced is regulated by valve 45. Overflow or discharge conduit 46 is provided for discharging solids from bed 42. Gases are discharged from freeboard space 43 via conduit 70. There is also provided gas supply conduit assembly 47 which is valved as shown at 48 and through which auxiliary air may be added for reaction in zone B.

Zone D is equipped with a constriction plate 60 having apertures as at 61 and adapted to hold a fluidized bed 62 of finely-divided solids above which is a freeboard space 63. Solids enter bed 62 from conduit 46 and from dust diminishing station discharge conduit 72. Finally treated solids are discharged from bed 62 via overflow conduit or spill-pipe 64 which is provided with a solids-flow regulator 65.

Finally discharged solids are delivered from conduit 64 through a solids-flow control assembly 92 into a solids transport conduit 90, which is valved as at 91, and are transported to bed 32 for regeneration.

Product gases leaving freeboard space 43 of zone B pass through conduit 70 into dust diminishing station 71 where entrained solids are separated from the gases. The separated solids are discharged via conduit 72 into bed 62. The partially cleaned gas is discharged from the dust diminishing station via conduit 74 into a gas scrubber 75. Water enters the gas scrubber through conduit 76 which is valved as at 77. The wash water is discharged from the scrubber via conduit 78 into distributing conduit 80. Distributing conduit 80 is equipped with two valves 81 and 82. Gases passing through valve 81 are sent to storage or directly to use while gases passing through valve 82 flow to compressor 83 thence through conduit 84 to return to the reactor for use as a fluidizing treatment gas.

In operation, sulfide solids to be treated are introduced into zone B via conduit 44 and the oxygen carrying solids are introduced into zone B via conduit 28. After the initial reaction has taken place in zone B the partially desulfurized solids are discharged via conduit 46 into bed 62 of zone D. In bed 62 the secondary reaction takes place and the residual sulfur is roasted in air or other free-oxygen bearing gas to produce a dilute SO$_2$. Such dilute SO$_2$ passes up through constriction plate 40 and acts as a fluidizing gas for bed 42. Gases leaving bed 42 are a mixture of dilute SO$_2$ from bed 62 and pure SO$_2$ produced in bed 42. This is the product gas and it leaves zone B to pass through dust diminishing station 71 and gas scrubber 75. A portion of this gas may be recycled via compressor 83 and conduit 84 for use as a fluidizing gas for bed 62 and also as heat transfer means for carrying heat from bed 62 into bed 42 to aid in maintaining temperatures within that bed.

As hereinafter discussed in connection with the operating example, the product gases contain unoxidized sulfur which is converted to sulfur-dioxide prior to entry of such gases into the scrubber.

Finally treated solids which are substantially sulfur-free are discharged from bed 62 and are returned through solids transport conduit 90 in closed circuit to regeneration zone A where they are roasted with air to oxidize them and produce heat.

A portion of regenerated solids is transferred to initial reaction zone B and the remainder are discharged from the reactor. Hot gases discharged from the regeneration zone may be used to dry and partially preheat incoming sulfur-bearing solids before such solids are introduced into the initial reaction zone.

Figure 2:
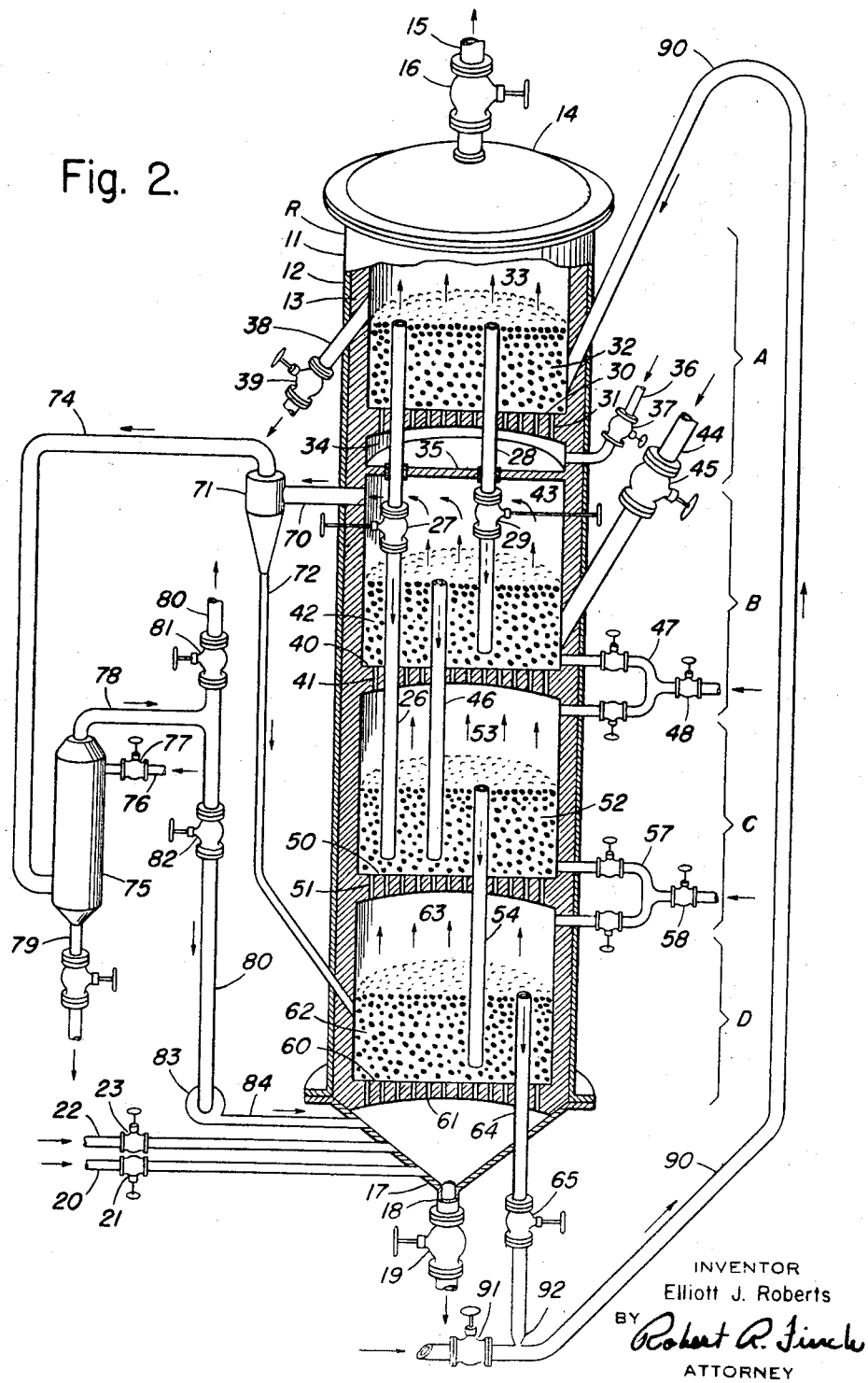
Figure 2 shows a modified embodiment of the invention wherein the primary sulfide-sulfur solid oxygen carrier reaction is carried out in a plurality of successive stages.

In Figure 2, the reactor "R" is made up of a cylindrical shell 11 having a metal outer wall 12 and lined with refractory material 13. The reactor has a top 14 which is equipped with a gas discharge conduit 15 provided with a valve 16. The reactor has a coned bottom 17 which is provided with a clean-out conduit 18 having a valve 19. Fluidizing gas is supplied to the coned bottom via conduit 20 which is valved as at 21. Fuel for supplying that heat for starting up can be furnished through conduit 22 which is valved as at 23 and such fuel combusted in a burner not shown.

The reactor is divided into zones such as A, B, C and D. Zone A is a regeneration zone for the production of regenerated metal oxides and heat. Zone B is an initial reaction zone wherein the initial stages of the sulfide-sulfur-metal-oxide reaction are carried out. Zone C is a further initial reaction zone wherein the later stages of the sulfide-sulfur-metal-oxide reaction is promoted by the addition of a fresh charge of high-valence metal-oxides. Thus zones B and C provide for the stage-wise reaction between sulfide-sulfur and metal-oxides. Zone D is a secondary reaction zone where residual sulfur is roasted by air.

In zone A there is provided a gas permeable plate 30 extending throughout the cross-sectional area of the reactor and equipped with apertures such as 31. This plate, commonly called a constriction plate, is adapted to hold thereon a bed 32 of finely-divided solids undergoing treatment above which is a freeboard space 33. Spaced below the constriction plate is a solid partition 35 which extends throughout the cross-sectional area of the reactor so as to define a plenum space 34 underlying constriction plate 30. Fluidizing and oxidizing gas is supplied to this plenum space via conduit 36 which is valved as at 37. Zone A is also equipped with three solids discharge conduits; one such conduit 38, valved as at 39, is used for discharging solids from the bed to a point outside the reactor, a second discharge conduit or overflow pipe 28 is equipped with a solids flow regulator 29 is provided for transferring solids from bed 32 of zone A into bed 42 of zone B, and a third overflow conduit 26, with a solids flow regulator 27, is provided for transferring fresh metal-oxides from bed 32 directly to bed 52 of reaction zone C.

Zone B is provided with a constriction plate 40 having apertures such as 41 and adapted to hold thereon a bed 42 of finely-divided solids above which is a freeboard space 43. Raw untreated solids are introduced into bed 42 via conduit 44 and the quantity of solids so introduced is regulated by valve 45. Overflow or discharge conduit 46 is provided for discharging solids from bed 42. Gases are discharged from freeboard space 43 via conduit 70. There is also provided gas-supply conduit assembly 47 which is valved as shown at 48 and through which auxiliary air may be added to promote the reaction in zone B while yielding heat therein.

Zone C is provided with a constriction plate 50 having apertures as at 51 and adapted to hold thereon a bed 52 of finely-divided solids above which is a freeboard space 53. Partially treated solids are introduced into bed 52 via conduit 46. Overflow or discharge conduit 54 is provided for discharging solids from bed 52 into bed 62. There is also provided gas supply conduit assembly 57 which is equipped with valves such as at 58 and through which auxiliary air may be supplied to react with sulfur to yield sulfur-dioxide and heat in Zone C.

Zones B and C are both initial reaction zones and the combined effect of the two zones is to carry out the reaction (I)  $Heat + FeS_2 + 16Fe_2O_3 \rightarrow 11Fe_3O_4 + 2SO_2$ This reaction proceeds in two stages as follows:

(Ia)  $FeS_2 + 6Fe_2O_3 \rightarrow FeS + 4Fe_3O_4 + SO_2$ (Ib)  $FeS + 10Fe_2O_3 \rightarrow 7Fe_3O_4 + SO_2$ While there is some controversy as to whether the $FeS_2$ is converted to $FeS_{1.18}$ or to FeS, for the purpose of this discussion it will be assumed that $FeS_2$ is converted to FeS in accordance with Equation Ia as given.

Of the foregoing equations the first one, namely Equation Ia proceeds much more rapidly than the second one. However, the reaction rate for the second reaction (Equation Ib) can be increased by the addition of more $Fe_2O_3$ and this is desirably accomplished in zones B and C wherein, in zone B the first stage Ia of the initial reaction is carried out and the reaction in zone C is aided by the addition of more $Fe_2O_3$. Such stage-wise reaction causes the overall reaction of Equation I to proceed more nearly to completion thus enabling the recovery of a greater quantity of sulfur as substantially pure sulfur-dioxide. Hence the final product gas will have a higher $SO_2$ content since there will be a smaller quantity of dilute $SO_2$ gas produced in zone D where residual sulfur is air roasted.

Zone D is equipped with a constriction plate 60 having apertures as at 61 and adapted to hold a fluidized bed 62 of finely-divided solids above which is a freeboard space 63. Solids enter bed 62 from a conduit 46 and from dust diminishing station discharge conduit 72. Such solids entering bed 62 contain sulfur which is recovered by air-roasting in that bed. Finally treated solids are discharged from bed 62 via overflow conduit or spill-pipe 64 which is valved as at 65.

Finally discharged solids are delivered from conduit 64 through a solids flow control assembly 92 into solids transport conduit 90, which is valved as at 91, and are transported into bed 32 for regeneration with air.

Product gases leaving freeboard space 43 of zone B pass through conduit 70 into dust diminishing station 71, where entrained solids are separated from the gases. Separated solids are discharged via conduit 72 into bed 62 while partially cleaned gas is discharged from the dust diminishing station via conduit 74 into a gas scrubber 75. Water enters the gas scrubber through conduit 76 which is valved as at 77. Wash water is discharged from the scrubber via valved conduit 79 and clean gas is discharged from the scrubber via conduit 78 into distributing conduit 80, which is equipped with two valves 81 and 82. Gases passing through valve 81 are sent to storage or directly to use while gases passing through valve 82 flow to compressor 83 thence through conduit 84 to return to the reactor for use as a fluidizing treatment gas.

In the operation, sulfide solids to be treated are introduced into zone B via conduit 44 and the reactant metal oxide solids are introduced into zone B via conduit 28. After the first stage Ia of the initial reaction has taken place in zone B, partially treated solids are discharged via overflow conduit 46 into bed 52 of reaction zone C, where they are mixed with a fresh charge of metal-oxide solids delivered from bed 32 via conduit 26. In bed 52 the reaction proceeds further toward completion finally leaving residually in the solids about 5–25% of their initial total sulfur content. Such residual sulfur-bearing solids flow from bed 52 through overflow conduit 54 into bed 62 of zone D. In bed 62 the secondary reaction or air roasting occurs whereby residual sulfur is recovered as a dilute $SO_2$ gas. This dilute $SO_2$ passes up through constriction plate 50 and acts as a fluidizing gas for beds 52 and 42 thereabove.

Gases leaving bed 42 constitute the product gas and are a mixture of dilute $SO_2$ from bed 62 and substantially pure $SO_2$ from beds 52 and 42. Such product gas passes through dust diminishing station 71 and gas scrubber 75 and a portion of it may be recycled via compressor 83 and conduit 84 for use as fluidizing gas for beds 62, 52 and 42 and also as a heat transfer means for carrying heat from bed 62 to beds 52 and 42.

Substantially sulfur-free solids are discharged from bed 62 and returned through solids transport conduit 90 in closed circuit to regeneration zone A where they are exothermically oxidized for reuse as an air regenerated oxygen carrier.

A portion of regenerated solids is transferred to initial reaction zone B and the rest are discharged from the reactor. Hot gases discharged from the regeneration zone may be used to dry and partially preheat incoming sulfur-bearing solids before such solids are introduced into the initial reaction zone.

A modification of the invention not shown in the drawings comprises the recirculation of a portion of hot sulfur-free solids from the secondary reaction bed directly to the initial reaction bed to aid in maintaining reaction temperatures therein. This is not the equivalent of the basic invention, but is useful under different conditions.

In connection with the heat balance requirements of the process of this invention it is to be noted that, in the embodiments illustrated, provision is made for allowing heated fines from the secondary reaction bed to pass upwardly through the initial reaction zone or zones, thus utilizing the sensible heat content of such fines to aid in maintaining temperatures in the initial zone or zones. This is accomplished by omitting to separate entrained fines from the upflowing gas stream until after such stream exits from the initial reaction bed.

*Example*

Apparatus similar to that shown in Figure 1 may be utilized to produce a gas having a sulphur-dioxide-content of approximately 24%. In a reactor having an inside diameter of 16 feet the upper oxide-regeneration zone should have a bed depth of approximately 2 feet with an overlying freeboard of 10 feet, the intermediate or initial reaction zone bed should have a depth of approximately 5 feet with an overlying freeboard of 10 feet while the lower or secondary reaction zone should have a bed depth of approximately 3 feet with an overlying freeboard space of 6 feet.

Referring now to the apparatus of Figure 1:

100 tons of finely-divided dry pyrite per 24 hours (minus 14 Tyler screen mesh) analyzing 50% sulfur is supplied at constant rate to bed 42 via conduit 44 and valve 45. Concomitantly 800 tons of ferric oxide (94% pure) is supplied to bed 42 from bed 32 via conduit 38 and valve 29. Bed 42 is maintained at 700° C. and is fluidized by a sulfur-dioxide-nitrogen mixture uprising from freeboard 63 of the lower zone.

In bed 42 half the sulfur of the pyrite is converted to sulfur-dioxide by reaction with ferric oxide whereby the ferric oxide is reduced to $Fe_3O_4$. This yields about 75 tons of FeS (including about 6 tons of inert materials). Gas leaving bed 42 analyzes substantially 24% sulfur-dioxide and 76% nitrogen and also contains some entrained dust half of which is FeS and half $Fe_3O_4$ as well as some elemental sulfur. Cyclone 71 removes most of the entrained dust from the product gas stream and discharges it into bed 62 via conduit 72.

Some dust, particularly extremely fine material which amounts to about five tons per day of iron sulfide, and all of the elemental sulfur vapor passes through dust cyclone 71 into conduit 74 and will, unless special steps are taken, be lost from the process in scrubber 75.

In order to prevent loss of sulfur in the scrubber discharge water and also to prevent fouling of the scrubber by sulfur condensation, special steps are taken to oxidize both the sulfur vapor and sulfidic sulfur (FeS) in conduit 74 prior to entry of the gas into the scrubber. In accordance with the invention, this is accomplished by introducing pure oxygen or air into cyclone discharge conduit 74 to react with the sulfur. It is important that the oxygen so introduced be regulated to be sufficient to oxidize substantially all of the sulfur to sulfur-dioxide but not to sulfur-trioxide as the latter would be carried from the scrubber with the water. Thus, the oxygen requirement is to oxidize sulfur to sulfur-dioxide and the iron to $Fe_3O_4$. The gas will then pass through the scrubber while the $Fe_3O_4$ will be removed in the scrubber discharge water. To accomplish this there is provided an air inlet conduit 93 leading into conduit 74 through which air or other oxygen-bearing gas is controllably admitted through a suitable valve 94.

Oxygen entering conduit 74 reacts with the sulfur vapor and sulfide sulfur to yield sulfur-dioxide gas which becomes product gas or is returned through conduit 84 to the reactor. This results in a considerable saving in sulfur and at the same time avoids the danger of fouling scrubber 75 by condensation of elemental sulfur therein.

FeS and $Fe_3O_4$ in bed 42 discharges to bed 62 via conduit 46. In bed 62 a temperature of 980° C. is maintained by air oxidation of FeS to $Fe_3O_4$ and sulfur-dioxide. Some fine $Fe_3O_4$ ascends with the gas stream to bed 42 to thereby furnish some heat for reaction in that bed. The remaining $Fe_3O_4$, which constitutes substantially the entire solids product of bed 62, discharges through conduit 64, is picked up by an air stream passing through valve 91 and conveyed to regeneration bed 32 via conduit 90.

Bed 32 is fluidized by air introduced through conduit 36 whereby $Fe_3O_4$ is oxidized to $Fe_2O_3$ and heat is generated. Bed 32 is maintained at a temperature of approximately 980° C. by means of external cooling on conduit 90 to lower the temperature of $Fe_3O_4$ being conveyed therethrough to about 600° C. (The external cooling means is not shown in Figure 1.) A separate cooler may also be used, or excess air may be supplied to bed 32, or water may be injected directly into bed 32, all as a means of holding the temperature of that bed at approximately 980° C. Nitrogen in the gas plus any excess air or steam exits through conduit 15 while the oxidized material in bed 32 (ferric oxide) is recirculated as required to bed 42 via conduit 28.

In this particular case no auxiliary air is supplied via conduit 47 since beds 42 and 62 are in temperature balance under the conditions specified. Neither is blower 83 required to circulate a sulfur-dioxide-nitrogen mixture to carry heat from bed 62 to bed 42.

Fluidizing gas is supplied via conduit 20 at a rate sufficient to insure a space velocity in zone B of one foot per second. Fluidizing air is supplied to plenum space 35 at such a rate the space velocity of the gas passing through zone A is approximately 1.4 feet per second. It is to be noted, however, that variations in the fluidizing gas velocities are within the province of mechanical skill, and also that the quantity of air supplied to zone D must be correlated with the quantity of sulfur which must be oxidized in that zone.

Under the operating conditions specified a yield of 3,450 C. F. M. (18° C. and one atmosphere) of product gas having a 24% sulfur-dioxide content is obtained.

I claim:

The process for producing sulfur-dioxide gas which comprises establishing a first mass of finely divided solids in a first reaction zone, maintaining said mass of solids at a temperature sufficient to effect reaction between finely divided iron sulfide solids and ferric oxide solids but below the sintering temperature of solids in the mass, establishing a second mass of finely divided solids in a second reaction zone, maintaining said second mass of solids at a temperature sufficient to effect reaction between iron sulfide and free oxygen but below the sintering temperature of solids in said second mass, rendering both of said masses of solids as turbulently mobilized fluidized beds by passing a stream of gas at solids fluidizing velocities upwardly through the second mass of solids thence upwardly through the first mass of solids and discharging said gas from said first mass of solids, introducing finely-divided iron sulfide solids and ferric solids into said first mass of solids in proportions sufficient to effect partial desulfurization of the iron sulfide by reaction with ferric oxide to yield substantially pure sulfur dioxide gas while concomitantly forming unoxidized elemental sulfur vapor, discharging said pure sulfur-dioxide gas along with said unoxidized sulfur vapor from said first mass of solids in said uprising gas stream, transferring partially desulfurized solids from said first mass of solids into the second mass of solids, introducing a free oxygen bearing gas into the uprising gas stream passing through the second mass of solids in an amount sufficient to oxidize substantially all of the sulfur therein to sulfur-dioxide but insufficient to oxidize sulfur to sulfur trioxide thereby producing sulfur-dioxide gas and sulfur free solids, discharging such solids from the second mass, discharging the sulfur-dioxide gas from the second mass in said uprising gas stream and flowing it to the first mass of solids; said process being characterized in that additional free oxygen is introduced into the gases discharged from said first mass of solids in an amount sufficient to oxidize sulfur therein to sulfur-dioxide but insufficient to oxidize said sulfur to sulfur trioxide and a portion of said gases is introduced into said second mass of solids as the uprising gas stream passing through both of said masses.

References Cited in the file of this patent

UNITED STATES PATENTS

| | | |
|---|---|---|
| 2,625,464 | Roberts et al. | Jan. 13, 1953 |
| 2,637,629 | Lewis | July 6, 1954 |
| 2,766,102 | Lewis et al. | Oct. 9, 1956 |